United States Patent
Xu et al.

(10) Patent No.: US 8,533,195 B2
(45) Date of Patent: Sep. 10, 2013

(54) REGULARIZED LATENT SEMANTIC INDEXING FOR TOPIC MODELING

(75) Inventors: Jun Xu, Beijing (CN); Hang Li, Beijing (CN); Nicholas Craswell, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 51 days.

(21) Appl. No.: 13/169,808

(22) Filed: Jun. 27, 2011

(65) Prior Publication Data

US 2012/0330958 A1   Dec. 27, 2012

(51) Int. Cl.
  G06F 7/00   (2006.01)
  G06F 17/30   (2006.01)
  G06F 17/16   (2006.01)
  G06F 17/11   (2006.01)
  G06F 11/34   (2006.01)

(52) U.S. Cl.
  CPC .............. *G06F 17/16* (2013.01); *G06F 17/11* (2013.01); *G06F 11/3447* (2013.01); *G06F 2212/454* (2013.01)
  USPC ............ 707/738; 707/739; 707/750; 707/776

(58) Field of Classification Search
  CPC ... G06F 17/16; G06F 2212/454; G06F 17/11; G06F 11/3447
  USPC ................... 707/738, 739, 750, 776; 706/55
  See application file for complete search history.

(56) References Cited

U.S. PATENT DOCUMENTS

| | | | |
|---|---|---|---|
| 5,819,258 A * | 10/1998 | Vaithyanathan et al. | 707/692 |
| 6,418,431 B1 * | 7/2002 | Mahajan et al. | 704/257 |
| 6,687,696 B2 | 2/2004 | Hofmann et al. | |
| 6,847,966 B1 * | 1/2005 | Sommer et al. | 707/739 |
| 7,415,449 B2 * | 8/2008 | Zhong et al. | 706/55 |
| 2004/0088308 A1 * | 5/2004 | Bailey et al. | 707/100 |
| 2004/0220944 A1 * | 11/2004 | Behrens et al. | 707/100 |
| 2006/0106767 A1 * | 5/2006 | Adcock et al. | 707/3 |
| 2006/0112146 A1 * | 5/2006 | Song et al. | 707/200 |
| 2007/0011151 A1 * | 1/2007 | Hagar et al. | 707/4 |
| 2007/0233669 A2 * | 10/2007 | Martin et al. | 707/5 |
| 2009/0125498 A1 * | 5/2009 | Cao et al. | 707/5 |
| 2010/0262454 A1 * | 10/2010 | Sommer et al. | 705/10 |
| 2010/0280985 A1 | 11/2010 | Duchon et al. | |
| 2011/0004463 A1 | 1/2011 | Gryc et al. | |
| 2011/0060983 A1 | 3/2011 | Cai et al. | |

OTHER PUBLICATIONS

AlSumait et al, "On-Line LDS: Adaptive Topic Models for Mining Text Streams with Applications to Topic Detection and Tracking", 2008 8th IEEE Conf on Data Mining, Dec. 2008, 10 pgs.

(Continued)

*Primary Examiner* — Phong Nguyen
(74) *Attorney, Agent, or Firm* — Lee & Hayes, PLLC

(57) ABSTRACT

Electronic documents are retrieved from a database and/or from a network of servers. The documents are topic modeled in accordance with a Regularized Latent Semantic Indexing approach. The Regularized Latent Semantic Indexing approach may allow an equation involving an approximation of a term-document matrix to be solved in parallel by multiple calculating units. The equation may include terms that are regularized via either $l_1$ norm and/or via $l_2$ norm. The Regularized Latent Semantic Indexing approach may be applied to a set, or a fixed number, of documents such that the set of documents is topic modeled. Alternatively, the Regularized Latent Semantic Indexing approach may be applied to a variable number of documents such that, over time, the variable of number of documents is topic modeled.

20 Claims, 6 Drawing Sheets

(56) References Cited

OTHER PUBLICATIONS

Asuncion et al, "Asynchronous Distributed Estimation of Topic Models for Document Analysis", Statistical Methodology, 8(1), Jan. 2011, 16 pgs.
Blei et al, "Latent Dirichlet Allocation" Journal of Machine Learning Research, 3, Jan. 2003, 30 pgs.
Buluc et al, "Challenges and Advances in Parallel Sparse Matrix-Matrix Multiplication", 37th Intl Conf on Parallel Processing, Sep. 2008, 8 pgs.
Burges et al, "Learning to Rank with Nonsmooth Cost Functions", Neural Information Processing Systems Foundation Conf (NIPS), Dec. 2006, 8 pgs.
Chaiken et al, "Scope: Easy and Efficient Parallel Processing of Massive Data Sets", Proc VLDB Endowment (Very Large Database Endowment), vol. 1, Issue 2, Aug. 2008, 12 pgs.
Chen et al, "Atomic Decomposition by Basis Pursuit", SIAM Journal on Scientific Computing, vol. 20, No. 1, Aug. 1998, 29 pgs.
Chen et al, "Sparse Latent Semantic Analysis", In SIAM Intl Conf on Data Minng, Apr. 2011, 7 pgs.
Dean et al, "MapReduce: Simplified Data Processing on Large Clusters", 6th Symposium on Operating System Design and Implementation, Dec. 2004, 13 pgs.
Deerwester et al, "Indexing by Latent Semantic Analysis", Journal of the Am Soceity for Information Science, 41(6), Sep. 1990, 17 pgs.
Ding et al, "On the Equivalence Between Non-Negative Matrix Factorization and Probabilistic Latent Semantic Indexing", Computational Statistics and Data Analysis 52, Feb. 2008, 15 pgs.
Efron et al, "Least Angle Regression", The Annals of Statistics, vol. 32, No. 2, Jun. 2004, 93 pgs.
Friedman et al, "Pathwise Coordinate Optimization", The Annals of Applied Statistics, vol. 1, No. 2, Dec. 2007, 31 pgs.
Fu, "Penalized Regressions: The Bridge versus the Lasso", Journal of Computational and Graphical Statistics, vol. 7, No. 3, Sep. 1998, 20 pgs.
Gao et al, "Clustered SVD Strategies in Latent Semantic Indexing", Information Processing and Management 41, Sep. 2005, pp. 1051-1063.
Hoffman et al, "Online Learning for Latent Dirichlet Allocation", Neural Information Processing Systems Foundation Conf, Dec. 2010, 9 pgs.
Hofmann, "Probabilistic Latent Semantic Indexing", Proc 22nd Annual Intl ACM SIGIR conf on Research and Development in Infomration Retrieval, Aug. 1999, 8 pgs.
Lee et al, "Algorithms for Non-Negative Matrix Factorization", Proc 2000 Conf on Advances in Neural Information Processing Systems, 13, Nov.-Dec. 2000, 7 pgs.
Lee et al, "Efficient Sparse Coding Algorithms", 20th Annual Conf on Neural Information Processing Systems, Dec. 2006, 8 pgs.
Lee et al, "Learning the Parts of Objects by Non-Negative Matrix Factorization", Nature, Letters, vol. 401, Oct. 1999, 4 pgs.
Liu et al, "A MapReduce Based Distributed LSI", 2010 7th IEEE Intl Conf on Fuzzy Systems and Knowledge Discovery, Aug. 2010, 5 pgs.
Liu et al, "Distributed Nonnegative Matrix Factorization for Web-Scale Syadic Data Analysis on MapReduce", Intl World Wide Web Conf, Apr. 2010, 10 pgs.
Liu et al, "PLDA+: Parallel Latent Dirichlet Allocation with Data Placement and Pipeline Processing", ACM Transactions on Intelligent Systems and Techology, vol. 2, No. 3, Oct. 2010 18 pgs.
Mairal et al, "Supervised Dictionary Learning", Computer Vision and Pattern Recognition, Sep. 2008, 8 pgs.
Mimno et al, "Organizing the OCA: Learning Faceted Subjects from a Library of Digital Books", Joint Conf on Digital Libraries, Jun. 2007, 10 pgs.
Newman et al, "Distributed Inference for Latent Dirichlet Allocation", Proc Neural Information Processing Systems, Dec. 2007, 9 pgs.
Olshausen et al, "Sparse Coding with an Overcomplete Basis Set: A Strategy Employed by VI?", Vision Research, vol. 37, No. 23, Dec. 1997, 15 pgs.
Osborne et al, "A New Approach to Variable Selection in Least Squares Problems", IMA Journal of Numerical Analysis, vol. 20, No. 3, Jul. 2000, p. 389-404.
Robertson et al, "Okapi at TREC-3", Microsoft Research, Jan. 1995, 19 pgs.
Rubinstein et al, "Double Sparsity: Learning Sparse Dictionaries for Sparse Signal Approximation", IEEE Transactions on Signal Processing, vol. 58, No. 3, Mar. 2010, pp. 1553-1564.
Salton et al, "A Vector Space Model for Automatic Indexing", Communications of the ACM, vol. 18, Issue 11, Nov. 1975, pp. 613-620.
Singh et al, "A Unified View of Matrix Factorization Models", Proc of European Conf on Machine Learning and Knowledge Discovery in Databases—Part II, Oct. 2008, pp. 358-373.
Smola et al, "An Architecture for Parallel Topic Models", Pro of VLDB Endowment, vol. 3, No. 1, Sep. 2010, pp. 703-710.
Thakur et al, "Optimization of Collective Communication Operations in MPICH", Intl Journal of High Performance Computing Applications, vol. 19, No. 1, Spring 2005, pp. 49-66.
Waal et al, "The Influence of Input Matrix Representation on Topic Modelling Performance", Proc 21st Annual Symposium of the Pattern Recognition Assoc of South Africa, Nov. 2010, 6 pgs.
Wang et al, "Decoupling Sparsity and Smoothness in the Discrete Hierarchical Dirichlet Process", Neural Information Processing Systems Foundation Conf, Dec. 2009, 8 pgs.
Wang et al, "PLDA: Parallel Latent Dirichlet Allocation for Large Scale Applications", Proc 5th Intl Conf on Algorithmic Aspects in Information and Management, Jun. 2009, 14 pgs.
Wei et al, "LDA Based Document Models for Ad-Hoc Retrieval", Proc 29th Annual Intl SIGIR Conf on Research and Development in Information Retrieval, Aug. 2006, 8 pgs.
Wikipedia, "Lasso", retrieved on Apr. 27, 2011 from http://en.wikipedia.org/wiki/Lasso, 2 pgs.
Wikipedia, "Latent Semantic Indexing", retrieved on Apr. 27, 2011 at http://en.wikipedia.org/wiki/Latent_semantic_indexing, 9 pgs.
Wikipedia, "Norm (mathematics)", retrieved on Apr. 27, 2011 at http://en.wikipedia.org/wiki/L2_norm, 8 pgs.
Yan et al, "Parallel Inference for Latent Dirichlet Allocation on Graphics Processing Units", Neural Information Processing Systems Foundation Conf, Dec. 2009, 9 pgs.

* cited by examiner

REGULARIZED LATENT SEMANTIC INDEXING FOR TOPIC MODELING

BACKGROUND

Topic modeling is useful for knowledge discovery, relevance ranking in search, and document classification. Recent years have seen significant progress on topic modeling technologies in machine learning, information retrieval, natural language processing, and other related fields. Given a collection of text documents, a topic model represents the relationship between terms and documents through latent topics. A topic is defined as a probability distribution of terms or a cluster of weighted terms. A document is then viewed as a bag of terms generated from a mixture of latent topics.

Studies on topic modeling fall into two categories: probabilistic approaches and non-probabilistic (matrix factorization) approaches. In the probabilistic approaches, a topic is defined as a probability distribution over terms and documents are defined as data generated from mixtures of topics. To generate a document, one chooses a distribution over topics. Then, for each term in that document, one chooses a topic according to the topic distribution, and draws a term from the topic according to its term distribution. For example, Probabilistic Latent Semantic Indexing (PLSI) and Latent Dirichlet Allocation (LDA) are two widely-used generative models. (See, T. Hoffman, Probabilistic Latent Semantic Indexing, SIGIR, pages 50-57, 1999; and D. Blei, A. Y. Ng, and M. I. Jordan, Latent Dirichlet Allocation, JMLR, 3:993-1022, 2003.) In non-probabilistic approaches, a term-document matrix is projected into a K-dimensional topic space in which each axis corresponds to a topic. In the topic space, each document is represented as a linear combination of the K topics. Latent Semantic Indexing (LSI) is a representative non-probabilistic model. (See, S. Deerwester, S. T. Dumais, G. W. Furnas, T. K. Landauer, and R. Harshman, Indexing By Latent Semantic Analysis, *J AM SOC INFORM SCI,* 41:391-407, 1990.) LSI decomposes the term-document matrix with single value decomposition (SVD) under the assumption that topics are orthogonal. See also Non-negative Matrix Factorization (NMF) methods (e.g., D. D. Lee and H. S. Seung, Learning The Parts Of Objects With Nonnegative Matrix Factorization, *Nature,* 401:391-407, 1999; and D. D. Lee and H. S. Seung, Algorithms For Non-Negative Matrix Factorization, *NIPS* 13, pages 556-562. 2001) and Sparse Coding methods (e.g., H. Lee, A. Battle, R. Raina, and A. Y. Ng, Efficient Sparse Coding Algorithms, *NIPS,* pages 801-808. 2007; and B. A. Olshausen and D. J. Fieldt, Sparse Coding With An Overcomplete Basis Set: A Strategy Employed By V1, *VISION RES,* 37:3311-3325, 1997).

One of the main challenges in topic modeling is scaling to millions or even billions of documents while maintaining a representative vocabulary of terms, which is necessary in many applications such as web search. A typical approach is to approximate the learning processes of an existing topic model.

Probabilistic topic models like LDA and PLSI are not scalable. The scalability challenge for probabilistic topic models like LDA and PLSI mainly comes from the necessity of simultaneously updating the term-topic matrix to meet the probability distribution assumptions. When the number of terms is large, which is inevitable in real applications, this problem becomes particularly severe. For LSI, the scalability challenge is due to the orthogonality assumption in the formulation, and as a result the problem needs to be solved by Singular Value Decomposition (SVD) and thus is hard to be parallelized.

Most efforts to improve topic modeling scalability have modified existing learning methods, such as LDA. Newman, et al. proposed Approximate Distributed LDA (AD-LDA), in which each processor performs a local Gibbs sampling iteration followed by a global update. (D. Newman, A. Asuncion, P. Smyth, and M. Welling, Distributed Inference For Latent Dirichlet Allocation, *NIPS,* 2008.) Two recent papers implemented AD-LDA as PLDA and modified AD-LDA as PLDA+, using MPI and MapReduce. (See, Y. Wang, H. Bai, M. Stanton, W. Yen Chen, and E. Y. Chang, PLDA: Parallel Latent Dirichlet Allocation For Large-Scale Applications, *AAIM,* pages 301-314, 2009; Z. Liu, Y. Zhang, and E. Y. Chang. PLDA+: Parallel Latent Dirichlet Allocation With Data Placement And Pipeline Processing, *TIST,* 2010; R. Thakur and R. Rabenseifner, Optimization Of Collective Communication Operations In MPICH, *INT J HIGH PERFORM C,* 19:49-66, 2005; and J. Dean, S. Ghemawat, and G. Inc, Mapreduce: Simplified Data Processing On Large Clusters, *OSDI,* 2004.). L. AlSumait, D. Barbara, and C. Domeniconi, the authors of On-Line LDA: Adaptive Topic Models For Mining Text Streams With Applications To Topic Detection And Tracking, ICDM, 2008, proposed purely asynchronous distributed LDA algorithms based on Gibbs Sampling or Bayesian inference, called Async-CGB or Async-CVB, respectively. In Async-CGB and Async-CVB, each processor performs a local computation step followed by a step of communicating with other processors. In all the methods, the local processors need to maintain and update a dense term-topic matrix, usually in memory, which becomes a bottleneck for improving the scalability. Similarly, online versions of stochastic LDA have been proposed. (See, L. AlSumait, D. Barbara, and C. Domeniconi, On-Line LDA: Adaptive Topic Models For Mining Text Streams With Applications To Topic Detection And Tracking, ICDM, 2008; and M. D. Hoffman, D. M. Blei, and F. Bach, Online Learning For Latent Dirichlet Allocation, NIPS, 2010.)

Sparse methods have recently received a lot of attention in machine learning community. These methods aim to learn sparse representations (simple models) hidden in the input data by using $l_1$ norm regularization. Sparse Coding algorithms are proposed which can be used for discovering basis functions, to capture meta-level features in the input data. See, for example, H. Lee, A. Battle, R. Raina, and A. Y. Ng, Efficient Sparse Coding Algorithms, NIPS, pages 801-808. 2007; and B. A. Olshausen and D. J. Fieldt, Sparse Coding With An Overcomplete Basis Set: A Strategy Employed By V1, VISION RES, 37:3311-3325, 1997. One justification to the sparse methods is that human brains have similar sparse mechanism for information processing. For example, when Sparse Coding algorithms are applied to natural images, the learned bases resemble the receptive fields of neurons in the visual cortex. (B. A. Olshausen and D. J. Fieldt, Sparse Coding With An Overcomplete Basis Set: A Strategy Employed By V1, VISION RES, 37:3311-3325, 1997.) Previous work on sparse methods mainly focused on image processing. (R. Rubinstein, M. Zibulevsky, and M. Elad, Double Sparsity: Learning Sparse Dictionaries For Sparse Signal Approximation, IEEE T SIGNAL PROCES, pages 1553-1564, 2008.) The use of sparse methods for topic modeling was also proposed very recently by Chen et al. (. Chen, B. Bai, Y. Qi, Q. Lin, and J. Carbonell, Sparse Latent Semantic Analysis, NIPS Workshop, 2010.) Their motivation was not to improve scalability and they made an orthogonality assumption (requiring an SVD). C. Wang and D. M. Blei have proposed to discover sparse topics based on a modified version of LDA. (C. Wang and D. M. Blei, Decoupling Sparsity And Smoothness In The Discrete Hierachical Dirichlet Process, NIPS, 2009.)

SUMMARY

This disclosure describes a Regularized Latent Semantic Indexing approach to topic modeling of electronic documents. The Regularized Latent Semantic Indexing approach may allow an equation involving an approximation of a term-document matrix to be solved in parallel by multiple calculating units. The equation may include terms that are regularized via either $l_1$ norm and/or via $l_2$ norm. The Regularized Latent Semantic Indexing approach may be applied to a set, or a fixed number, of documents such that the set of documents is topic modeled. Alternatively, the Regularized Latent Semantic Indexing approach may be applied to a variable number of documents such that, over time, the variable of number of documents is topic modeled.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
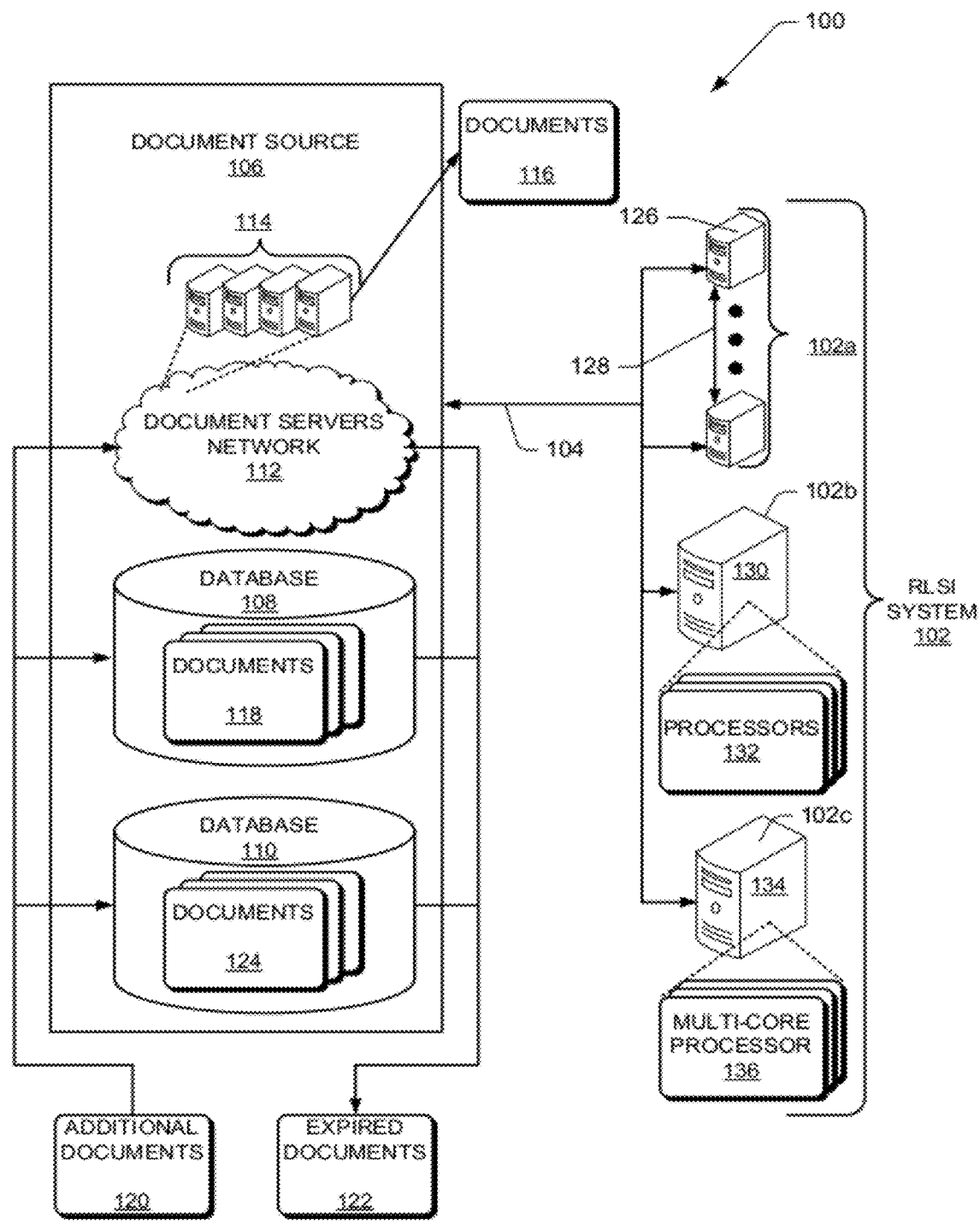
FIG. 1 is a schematic diagram of an illustrative environment to for topic modeling through scalable parallelization.

Topic modeling can boost the performance of information retrieval, but its real-world application is limited due to scalability issues. Scaling to larger document collections via parallelization is an active area of research, but most solutions require drastic steps such as vastly reducing input vocabulary.

Regularized Latent Semantic Indexing (RLSI) is a new method which is designed for parallelization. It is as effective as existing topic models, and scales to larger datasets without reducing input vocabulary. RLSI formalizes topic modeling as a problem of minimizing a quadratic loss function regularized by $l_1$ and/or $l_2$ norm. This formulation allows the learning process to be decomposed into multiple sub-optimization problems which can be optimized in parallel, for example via MapReduce. In one embodiment, $l_1$ norm is applied on topic representations and $l_2$ norm on document representations, to create a model with compact and readable topics and useful for retrieval.

One of the key problems in topic modeling is to improve scalability, to handle millions of documents or even more. As collection size increases, so does vocabulary size, rather than a maximum vocabulary being reached. For example, in an experiment involving 1.6 million web documents, there are more than 7 million unique terms even after pruning the low frequency ones (e.g., term frequency in the whole collection less than 2). This means that both matrices, term-topic (U) and topic-document (V), grow as the number of documents increases.

Regularized Latent Semantic Indexing (RLSI) is intrinsically scalable. Topic modeling is formalized as minimization of a quadratic loss function on term-document occurrences regularized by $l_1$ and/or $l_2$ norm. Specifically, in RLSI the text collection is represented as a term-document matrix (D), where each entry represents the occurrence (or term frequency-inverse document frequency (tf-idf) score) of a term in a document. The term-document matrix (D) is then approximated by the product of two matrices: a term-topic matrix (U) which represents the latent topics with terms and a topic-document matrix (V) which represents the documents with topics. Finally, a quadratic loss function is defined as the squared Frobenius Norm of the difference between the term-document matrix (D) and the product of term-topic matrix (U) and topic-document matrix (V). Both $l_1$ norm and $l_2$ norm may be used for regularization. In one embodiment, $l_1$ norm is applied to topic representations U and $l_2$ norm is applied to document representations V, which can result in a model with compact and readable topics and useful for retrieval. While RLSI makes use of the same quadratic loss function as LSI, RLSI differs from LSI in that it uses regularization rather than orthogonality to constrain the solutions. In contrast to LSI, which is not scalable, RLSI is scalable.

In one embodiment, the learning process of RLSI iteratively updates the term-topic matrix (U) given the fixed topic-document matrix (V), and updates the topic-document matrix (V) given the fixed term-topic matrix (U). The formulation of RLSI makes it possible to decompose the learning problem into multiple sub-optimization problems and conduct learning in parallel. Specifically, for both the term-topic matrix (U) and the topic-document matrix, the update in each iteration is decomposed into many sub-optimization problems. These may be run in parallel, which is a reason that RLSI can scale up.

In one embodiment, RLSI is implemented employing MapReduce. A MapReduce system maps the sub-optimization problems over multiple processors and then merges (reduces) the results from the processors. During this process, documents and terms are distributed and processed automatically.

Regularization is a technique in machine learning to prevent over-fitting. Typical examples of regularization in machine learning include the use of $l_1$ and $l_2$ norms. Regularization via $l_1$ norm uses the sum of absolute values of parameters and thus has the effect of causing many parameters to be zero and selecting a sparse model as solution. Regularization via $l_2$ norm, on the other hand, uses the sum of squares of parameters and thus can make a smooth regularization and effectively deal with over-fitting.

The processes and systems described herein may be implemented in a number of ways. Example implementations are provided below with reference to the following figures

Illustrative Environment

FIG. 1 is a schematic diagram of an illustrative environment 100 for topic modeling of documents through scalable parallelization. The environment 100 may include at least one RLSI system, individually referenced as 102a-102c and collectively referenced as 102, and a communication link 104. The RLSI system 102 is communicatively coupled to a document source 106 via the communication link 104. The communication link 104 may be a wireless or wired, including optical fiber, communication link that provides communication paths.

Document source 106 may include a static or quasi-static document database 108, a document database 110, and document servers network 112. The document servers network 112 may conform to internet protocols and may include wide area networks (WANs), the World Wide Web being an exemplary WAN, and local area networks (LANs). The document servers network 112 includes a plurality of document servers 114, which are communicatively coupled together. In one embodiment, the document servers 114 are web servers that store and provide documents 116 such as webpages. The number of documents stored in the servers 114 may vary over time as additional documents 120 are uploaded and old/expired documents 122 are removed.

The static or quasi-static document database 108 has a plurality (N) of documents 118 stored therein. The number (N) of documents 118 stored in the static or quasi-static document database 108 may be generally fixed or change infrequently over time. For example, additional documents 120 may be added to the static or quasi-static document database 108 on a weekly, or monthly, or even longer than a monthly, basis and similarly, expired documents 122 may be removed from the static or quasi-static document database 108 on a weekly, or monthly, or even longer than a monthly, basis.

The document database 110 also has a plurality of documents 124 stored therein. The number (N(t)) of documents 124 stored in the document database 120 may vary over time. For example, additional documents 120 may be added to the document database 110 on a daily, or hourly, or even less than hourly, basis, and similarly, expired documents 122 may be removed from the document database 110 on a daily, or hourly, or even less than hourly, basis.

The RLSI system 102 retrieves documents 116, 118, 124 from the document source 106 and topic models the retrieved documents 116, 118, 124.

In one embodiment, the RLSI system 102a includes multiple computing devices 126 coupled together by a network 128. The multiple computing devices 126 may be servers, main frame computers, personal computers, etc. The multiple computing devices 126 work in parallel to topic model the retrieved documents 116, 118, 124. One or more of the computing devices 126 may be a multi-processor computing device. Further, one or more processors of the computing devices 126, including multi-processor computing devices, may be a multi-core processor.

The RLSI system 102b includes at least one multi-processor computing device 130 having multiple processors 132. The multiple processors 132 work in parallel to topic model the retrieved documents 116, 118, 124. One or more of the processors 132 of the multi-processor computing device 130 may be a multi-core processor The RLSI system 102c includes at least one computing device 134 having at least one multi-core processor 136. The multi-core processor 136 includes multiple processing cores, which work in parallel to topic model the retrieved documents 116, 118, 124.

For the purposes of this disclosure, a calculating unit is defined as including, at least one of, a processing core of a multi-core processor, a processor of a multi-processor computing device, and a computing device.

RLSI Overview

Documents 116, 118, 124 retrieved from the document source 106 may be described as a set of documents D with size N, containing terms from a vocabulary V with size M. A document is simply represented as an M-dimensional vector d, where the $m^{th}$ entry denotes the score of the $m^{th}$ term, for example, a Boolean value indicating occurrence, term frequency-inverse document frequency (tf-idf) or joint probability of the term and document. The N documents in D are then represented in an M×N term-document matrix $D=[d_1, \ldots, d_N]$, in which each row of the term-document matrix D corresponds to a term and each column of the term-document matrix D corresponds to a document.

Columns of a matrix such as, for example, the term-document matrix D, may be referred to herein as column-vectors of the matrix, and similarly, rows of a matrix may be referred to herein as row-vectors of the matrix.

A topic is defined over terms in the vocabulary and is also represented as an M-dimensional vector u, where the $m^{th}$ entry denotes the weight of the $m^{th}$ term in the topic. Intuitively, the terms with larger weights are more indicative to the topic. Suppose that there are K topics in the collection. The K topics can be summarized into an M×K term-topic matrix $U=[u_1, \ldots, u_K]$, in which each column corresponds to a topic.

Topic modeling means discovering the latent topics in the document collection as well as modeling the documents by representing them as mixtures of the topics. More precisely, given topics $u_1, \ldots, u_K$, document $d_n$ is succinctly represented as $$d_n \approx \sum_{k=1}^{K} v_{kn} u_k = U v_n,$$

where $v_{kn}$ denotes the weight of the $k^{th}$ topic $u_k$ in document $d_n$. The larger value of $v_{kn}$, the more important role topic $u_k$ plays in the document. Let $V=[v_1, \ldots, v_N]$ be the topic-document matrix, where column $v_n$ stands for the representation of document $d_n$ in the latent topic space. Table 1 below provides a summary of notation.

TABLE 1

Table of notations.

| Notation | Meaning |
|---|---|
| M | Number of terms in vocabulary |
| N | Number of documents in collection |
| K | Number of topics |
| $D \in R^{M \times N}$ | Term-document matrix $[d_1, \ldots, d_N]$ |
| $d_n$ | The $n^{th}$ document |
| $d_{mn}$ | Weight of the $m^{th}$ term in document $d_n$ |
| $U \in R^{M \times K}$ | Term-topic matrix $[u_1, \ldots, u_K]$ |
| $u_k$ | The $k^{th}$ topic |
| $u_{mk}$ | Weight of the $m^{th}$ term in topic $u_k$ |
| $V \in R^{K \times N}$ | Topic-document matrix $[v_1, \ldots, v_N]$ |
| $v_n$ | Representation of $d_n$ in the topic space |
| $v_{kn}$ | Weight of the $k^{th}$ topic in $v_n$ |

Different topic modeling techniques choose different schemas to model matrices U and V and impose different constraints on them. For example, in the generative topic models such as PLSI and LDA, $u_1, \ldots, u_K$ are probability distributions so that $$\sum_{m=1}^{M} u_{mk} = 1$$

for k=1, ..., K; In LSI, topics $u_1, \ldots, u_K$ are orthogonal and thus SVD can be applied.

However, Regularized Latent Semantic Indexing (RLSI) learns latent topics as well as representations of documents from the given text collections in the following way.

Document $d_n$ is approximated as $Uv_n$ where U is the term-topic matrix (U) and $v_n$ is the representation of $d_n$ in the latent topic space. The goodness of the approximation is measured by the quadratic loss of the difference between $d_n$ and $Uv_n$: $\|d_n-Uv_n\|_2^2$. Furthermore, regularization is made on topics and document representations. Specifically in some embodiments, $l_1$ norm regularization is applied to term-topic matrix U (i.e., topics $u_1, \ldots, u_k$) and $l_2$ is applied to the topic-document matrix V (i.e., document representations $v_1, \ldots, v_N$) to favor a model with compact and readable topics and useful for retrieval.

Thus, given a text collection $D=\{d_1, \ldots, d_N\}$, RLSI amounts to solving the following optimization problem shown in Equation (1):

$$\min_{U,\{v_n\}}\left[\sum_{n=1}^{N}\|d_n - Uv_n\|_2^2 + \lambda_1 \sum_{k=1}^{K}\|u_k\|_1 + \lambda_2 \sum_{n=1}^{N}\|v_n\|_2^2\right], \quad (1)$$

where $\lambda_1 \geq 0$ is the parameter controlling the regularization on $u_k$: the larger value of $\lambda_1$, the more sparse $u_k$; and $\lambda_2 \geq 0$ is the parameter controlling the regularization on $v_n$: the larger value of $\lambda_2$, the larger amount of shrinkage on $v_n$.

In general, the regularization on topics and document representations (the second term and the third term) can be either $l_1$ norm or $l_2$ norm. When they are $l_2$ and $l_1$, respectively, the process is equivalent to Sparse Coding. When both of them are $l_1$, the model is similar to a double sparse model. Note that both Sparse Coding and double sparse model formulate optimization problems in constrained forms instead of regularized forms. The two forms are equivalent.

Using the formulation above (i.e. regularization via $l_1$ norm on topics and $l_2$ norm on document representations) leads to a model with compact and readable topics and useful for retrieval. Advantages of the above formulation are included below.

First, $l_1$ norm regularization on topics has the effect of making them compact, under the assumption that the essence of a topic can be captured via a small number of terms, which is reasonable in practice. In many applications, small and concise topics are more useful. For example, small topics can be interpreted as sets of synonyms, roughly corresponding to the WordNet synsets used in natural language processing.

Second, $l_1$ norm can make the topics readable, no matter whether it is imposed on topics or document representations. This has advantages in applications such as text summarization and visualization.

Third, there are four ways of combining $l_1$ and $l_2$ norms. Results of retrieval experiments across multiple test collections described herein, across multiple test collections, show that better ranking performance may be achieved with $l_1$ norm on topics and $l_2$ norm on document representations.

Last, in both learning and using of topic models, topic sparsity means that topics may be efficiently stored and processed. In some embodiments, existing techniques on sparse matrix computation may be employed, which are efficient and scalable.

RLSI Optimization

The optimization equation (1) is convex with respect to U when V is fixed and convex with respect to V when U is fixed. However, it is not convex with respect to both of them. Following the practice in Sparse Coding, the function in Equation (1) may be optimized by alternately minimizing it with respect to term-topic matrix U and topic-document matrix V. This procedure is summarized in Algorithm 1, hereinbelow. Note that for simplicity Algorithm 1 describes the case of when $l_1$ norm is imposed on topics and $l_2$ norm on document representations. However, other the scope of the disclosure is not limited to this regularization strategy. Other regulation strategies such as, but not limited to, include: (a) imposing $l_1$ norm on topics and document representations; (b) imposing $l_2$ norm on topics and document representations; and (c) imposing $l_2$ norm on topics and $l_1$ norm on document representations.

---

Algorithm 1 Regularized Latent Semantic Indexing

Require: $D \in \mathbb{R}^{M \times N}$
1: $V^{(0)} \in R^{K \times N}$ ← random matrix
2: for t = 1 : T do
3: $\quad U^{(t)} \leftarrow \text{UpdateU}(D, V^{(t-1)})$
4: $\quad V^{(t)} \leftarrow \text{UpdateV}(D, U^{(t)})$
5: end for
6: return $U^{(T)}, V^{(T)}$

---

In Algorithm 1, the term-document matrix D is dimensioned to be an M×N matrix in which each column represents a document and rows therein represent terms. The topic-document matrix V is dimensioned to be a K×N matrix and initialized with random values.

Algorithm 1 is iterative. An updated term-topic matrix U is determined based at least on the term-document matrix D and a current topic-document matrix V, then an updated topic-document matrix V is determined based at least on the term-document matrix D and the updated term-topic matrix U.

In some embodiments, steps 3 and 4 of Algorithm 1 may be applied for a set number of iterations.

In other embodiments, steps 3 and 4 may be applied for a variable number of iterations. For example, after a number of steps, the topic-document matrix V and/or the term-topic matrix U may have converged (i.e., an update to the topic-document matrix V and an update to the term-topic matrix U may produce changes to the topic-document matrix V and the term-topic matrix U below a threshold amount) and, after convergance, steps 3 and 4 are no longer repeated. Convergence may be determined based at least in part on convergance of one or both of the topic-document matrix V, and/or the term-topic matrix U, the difference between $d_n$ and $Uv_n$: $\|d_n-Uv_n\|_2^2$, and/or the minimization of the Equation 1.

RLSI Optimization: Update of Matrix U

Holding $V=[v_1, \ldots, v_N]$ fixed, the update of U amounts to the following optimization problem shown in Equation (2):

$$\min_{U}\left[\|D - UV\|_F^2 + \lambda_1 \sum_{m=1}^{M}\sum_{k=1}^{K}|u_{mk}|\right], \quad (2)$$

where $\|\cdot\|_F$ is the Frobenius norm and $u_{mk}$ is the $(mk)^{th}$ entry of U. Let $\bar{d}_m=(d_{m1}, \ldots, d_{mN})^T$ and $\bar{u}_m=(u_{m1}, \ldots, u_{mK})^T$ be the column vectors whose entries are those of the $m^{th}$ row of D and U respectively. Thus, Equation (2) can be rewritten as $$\min_{\{u_m\}} \left[ \sum_{m=1}^{M} \|\bar{d}_m - V^T \bar{u}_m\|_2^2 + \lambda_1 \sum_{m=1}^{M} \|\bar{u}_m\|_1 \right], \quad (2a)$$

which can be decomposed into M optimization problems that can be solved independently, with each corresponding to one row of U as shown in Equation (3):

$$\min_{\bar{u}_m} \left[ \|\bar{d}_m - V^T \bar{u}_m\|_2^2 + \lambda_1 \|\bar{u}_m\|_1 \right], \quad (3)$$

for m=1, . . . , M.

Equation (3) is an $l_1$-regularized least squares problem, whose objective function is not differentiable and it is not possible to directly apply gradient-based methods. A number of techniques can be used here, such as interior point method, coordinate descent with soft-thresholding, Lars-Lasso algorithm, and feature-sign search. In some embodiments, coordinate descent with soft-thresholding may be used.

Let $\bar{v}_k = (v_{k1}, \ldots, v_{kN})^T$ be the column vector whose entries are those of the $k^{th}$ row of V, $V_{\setminus k}^T$ the matrix of $V^T$ with the $k^{th}$ column removed, and $\bar{u}_{m \setminus k}$ the vector of $\bar{u}_m$ with the $k^{th}$ entry removed, and we can rewrite the objective function in Equation (3) as $$L(\bar{u}_m) = \|\bar{d}_m - V_{\setminus k}^T \bar{u}_{m \setminus k} - u_{mk} \bar{v}_k\|_2^2 + \lambda_1 \|\bar{u}_{m \setminus k}\|_1 + \lambda_1 |u_{mk}|$$

$$= u_{mk}^2 \|\bar{v}_k\|_2^2 - 2 u_{mk} (\bar{d}_m - V_{\setminus k}^T \bar{u}_{m \setminus k})^T \bar{v}_k + \lambda_1 |u_{mk}| + const$$

$$= u_{mk}^2 s_{kk} - 2 u_{mk} \left( r_{mk} - \sum_{l \neq k} s_{kl} u_{ml} \right) + \lambda_1 |u_{mk}| + const,$$

where $s_{ij}$ and $r_{ij}$ are the $(ij)^{th}$ entries of K×K matrix $S = VV^T$ and M×K matrix $R = DV^T$, respectively, and const is a constant with respect to $u_{mk}$. Then, the minimization over $u_{mk}$ is preformed while keeping all the $u_{ml}$ fixed for which $l \neq k$. Furthermore, $L(\bar{u}_m)$ is differentiable with respect to $u_{mk}$ except for the point $u_{mk} = 0$. Forcing the partial derivative to be zero leads to $$u_{mk} = \begin{cases} \dfrac{\left( r_{mk} - \sum_{l \neq k} s_{kl} u_{ml} \right) - \frac{1}{2} \lambda_1}{s_{kk}}, & \text{if } u_{mk} > 0, \\ \dfrac{\left( r_{mk} - \sum_{l \neq k} s_{kl} u_{ml} \right) + \frac{1}{2} \lambda_1}{s_{kk}}, & \text{if } u_{mk} < 0, \end{cases}$$

which can be approximated by the following update rule:

$$u_{mk} \leftarrow \frac{\left( \left| r_{mk} - \sum_{l \neq k} s_{kl} u_{ml} \right| - \frac{1}{2} \lambda_1 \right)_+ \text{sign}\left( r_{mk} - \sum_{l \neq k} s_{kl} u_{ml} \right)}{s_{kk}},$$

where $(\cdot)_+$ denotes the hinge function. The algorithm for updating U is summarized in Algorithm 2.

---

Algorithm 2 UpdateU

Require: $D \in \mathbb{R}^{M \times N}, V \in \mathbb{R}^{K \times N}$
1: $S \leftarrow VV^T$
2: $R \leftarrow DV^T$
3: for m = 1 : M do
4:    $\bar{u}_m \leftarrow 0$
5:    repeat
6:       for k = 1 : K do
7:          $w_{mk} \leftarrow r_{mk} - \Sigma_{l \neq k} s_{kl} u_{ml}$
8:          $u_{mk} \leftarrow \dfrac{\left( |w_{mk}| - \frac{1}{2} \lambda_1 \right)_+ \text{sign}(w_{mk})}{s_{kk}}$
9:       end for
10:   until convergence
11: end for
12: return U

---

RLSI Optimization: Update of Matrix V

The update of V with U fixed is a least squares problem with $l_2$ norm regularization. It can also be decomposed into N optimization problems, with each corresponding to one $v_n$ and can be solved in parallel:

$$\min_{v_n} \left[ \|d_n - U v_n\|_2^2 + \lambda_2 \|v_n\|_2^2 \right],$$

for n=1, . . . , N. It is a standard $l_2$-regularized least squares problem (also known as Ridge Regression in statistics) and the solution is:

$$v_n^* = (U^T U + \lambda_2 I)^{-1} U^T d_n.$$

Algorithm 3 shows the procedure. (If K is large such that the matrix inversion $(U^T U + \lambda_2 I)^{-1}$ is hard, gradient descent in the update of $v_n$ may be employed.)

---

Algorithm 3 UpdateV

Require: $D \in \mathbb{R}^{M \times N}, U \in \mathbb{R}^{M \times K}$
1: $\Sigma \leftarrow (U^T U + \lambda_2 I)^{-1}$
2: $\Phi \leftarrow U^T D$
3: for n = 1 : N do
4:    $v_n \leftarrow \Sigma \phi_n$, where $\phi_n$ is the $n^{th}$ column of $\Phi$
5: end for
6: return V

---

Distributed RLSI: MapReduce

MapReduce is a computing model that supports distributed computing on large datasets. MapReduce expresses a computing task as a series of Map and Reduce operations and performs the task by executing the operations in a distributed computing environment. In some embodiments, RLSI may be implemented via MapReduce, referred to as Distributed RLSI.

Figure 2:
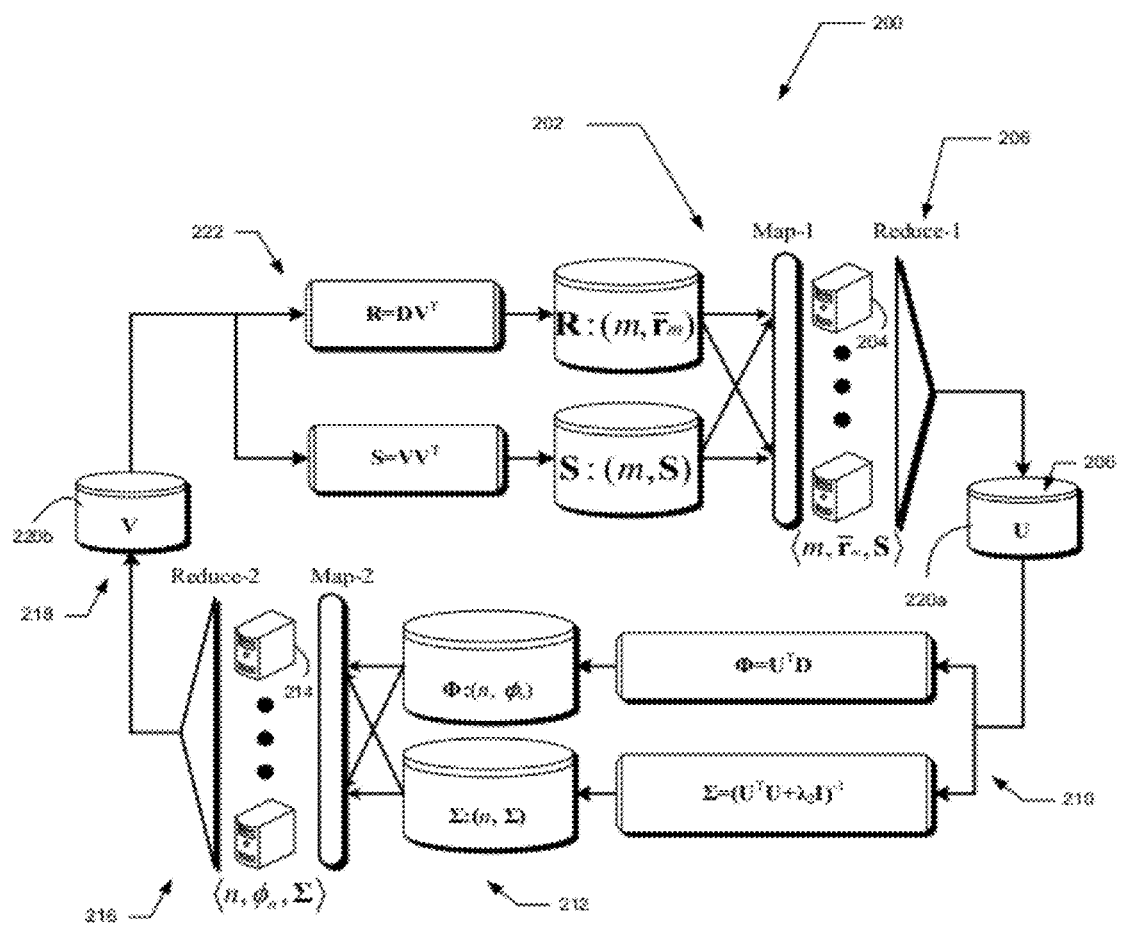
FIG. 2 is a schematic diagram of distributed Regularized Latent Semantic Indexing (RLSI).

FIG. 2 is a schematic representation of Distributed RLSI 200. At each iteration, U and V are updated using the following MapReduce operations as shown below.

At 202, Map-1, where each iteration involves two mappings and Map-1 is the first of the iteration: Broadcast $S = VV^T$ and map $R = DV^T$ on m (m=1, . . . , M) such that all of the entries in the $m^{th}$ row of R are shuffled to the same calculating unit 204 in the form of $\langle m, \bar{r}, S \rangle$, where $\bar{r}_m$ is the column vector whose entries are those of the $m^{th}$ row of R.

At 206, Reduce-1, where each iteration involves two reductions and Reduce-1 is the first reduction of the iteration: Take $\langle m, \bar{r}_m, S \rangle$ and emit $\langle m, \bar{u}_m \rangle$, where $\bar{u}_m$ is the optimal solution for the $m^{th}$ optimization problem (Equation (3)).

At 208, recombine the solutions to form the U matrix: U=[$\bar{u}_1, \ldots, \bar{u}_M$]$^T$ and store/buffer in storage device 220a.

At 210, calculate $\Sigma = (U^T U + \lambda_2 I^1)^{-1}$ and $\Phi = U^T D$.

At 212, Map-2, broadcast $\Sigma$ and map $\Phi = U^T D$. n (n=1, ..., N) such that the entries in the $n^{th}$ column of $\Phi$ are shuffled to the same calculating unit 214 in the form of $\langle n, \phi_n, \Sigma \rangle$, where $\phi_n$ is the $n^{th}$ column of $\Phi$.

At 216, Reduce-2, take $\langle n, \phi_n, \Sigma \rangle$, and emit $\langle n, v_n = \Sigma \phi_n \rangle$, where $v_n$ is the optimal solution for the $n^{th}$ optimization problem (Equation (3)).

At 218, recombine the solutions to form the V matrix: V=[$v_1, \ldots, v_N$] and store/buffer in storage device 220b.

At 222, calculate $S = VV^T$ and $R = DV^T$.

The process returns to 202, Map-1, for another iteration. In some embodiments, the process may be implemented for a set number of iteration. In other embodiments, the process may be implemented for a variable number of iterations and may be ceased based on a convergence.

Note that the data partitioning schemas for R in Map-1 and for $\Phi$ in Map-2 are different. R is split such that entries in the same row (corresponding to one term) are shuffled to the same calculating unit while $\Phi$ is split such that entries in the same column (corresponding to one document) are shuffled to the same calculating unit.

There are a number of large scale matrix multiplication operations in operation Map-1 ($DV^T$ and $VV^T$) and Map-2 ($U^T D$ and $U^T U$). These matrix multiplication operations can also be conducted on MapReduce infrastructure efficiently. As example, $DV^T$ can be calculated as $$\sum_{n=1}^{N} d_n v_n^T$$

and thus fully parallelized.

RLSI: MPI Platforms

RLSI may also be implemented in Message-Passing Interface (MPI) platforms. In this case, the rows of U and columns of V can be updated on each of the processors. Algorithm 4 provides an overview, and algorithms 5 and 6 provide the details for updating U and V on MPI in each iteration, respectively.

---

Algorithm 4 Parallel RLSI using MPI

---

Require: D $\in \mathbb{R}^{M \times N}$
1: $V^{(0)} \in R^{K \times N} \leftarrow$ random matrix
2: for t = 1 : T do
3:   $U^{(t)} \leftarrow$ MPI-UpdateU(D, $V^{(t-1)}$)
4:   $V^{(t)} \leftarrow$ MPI-UpdateV(D, $U^{(t)}$)
5: end for
6: return $U^{(T)}, V^{(T)}$

---

Algorithm 5 MPI-UpdateU

---

Require: D $\in \mathbb{R}^{M \times N}$, V $\in \mathbb{R}^{K \times N}$
1: Calculate S $\leftarrow VV^T$ and R $\leftarrow DV^T$ in parallel
2: Assign rows of R to P processors such that $\bar{r}_m$ is assigned to processor $\lfloor m/P \rfloor$
3: for p = 0 : P – 1 do
4:   Load S on processor p
5:   Load assigned $\bar{r}_m$ into $R^P = [\bar{r}_1^P, \ldots, \bar{r}_J^P]$, where $\bar{r}_{(m\%P)}^P = \bar{r}_m$
6:   for j = 1 : J do

---

Algorithm 5 MPI-UpdateU

---

7:     $\bar{u}_j \leftarrow 0$
8:     repeat
9:       for k = 1 : K do
10:        $w_{jk} \leftarrow r_{jk}^P - \Sigma_{l \neq k} s_{kl} u_{jl}$
11:

$$u_{jk} \leftarrow \frac{\left(|w_{jk}| - \frac{1}{2}\lambda_1\right)_+ \text{sign}(w_{jk})}{s_{kk}}$$

12:      end for
13:    until convergence
14:  end for
15:  $U^P = [\bar{u}_1^P, \ldots, \bar{u}_J^P]^T$
16: end for
17: Synchronize
18: U $\leftarrow [U^{1T}, \ldots, U^{PT}]^T$.
19: return U

---

Algorithm 6 MPI-UpdateV

---

Require: D $\in \mathbb{R}^{M \times N}$, U $\in \mathbb{R}^{M \times K}$
1: Calculate $\Sigma \leftarrow (U^T U + \lambda_2 I)^{-1}$ and $\Phi \leftarrow U^T D$ in parallel
2: Assign columns of $\Phi$ to P processors such that $\phi_n$ is assigned to processor $\lfloor n/P \rfloor$
3: for p = 0 : P – 1 do
4:   Load $\Sigma$ on processor p
5:   Load assigned $\phi_s$'s into $\Phi^P = [\phi_1^P, \ldots, \phi_Q^P]$, where $\phi_{(n\%P)}^P = \phi_n$.
6:   for q = 1 : Q do
7:     $v_q^P \leftarrow \Sigma \phi_q^P$
8:   end for
9:   $V^P = [v_1^P, \ldots, v_Q^P]$
10: end for
11: Synchronize
12: V $\leftarrow [V^1, \ldots, V^P]$.
13: return V

---

In some embodiments, the algorithms may be implemented for a set number of iterations.

In other embodiments, the algorithms may be implemented for a variable number of iterations and may be ceased based on a convergence. For example, the algorithms may be ceased based at least in part on convergance of one or both of the topic-document matrix V, and/or the term-topic matrix U. Alternatively, the algorithms may be ceased based on convergance of the difference between $d_n$ and $U v_n$: $\|d_n - U v_n\|_2^2$. Alternatively, the algorithms may be ceased based on convergance of the minimization of Equation (1).

Online Learning for RLSI

In some embodiments, RLSI may employed for on-line learning of documents. Given a text collection D={$d_1, \ldots, d_N$}, the RLSI loss function may be written as shown in Equation (4):

$$\min_{U, \{v_n\}} \left[ \frac{1}{N} \sum_{n=1}^{N} [\|d_n - U v_n\|_2^2 + \lambda_2 \|v_n\|_2^2] + \lambda_1 \sum_{k=1}^{K} \|u_k\|_1 \right], \quad (4)$$

where $\lambda_1 \geq 0$ is the parameter controlling the regularization on $u_k$: the larger value of $\lambda_1$, the more sparse $u_k$; and $\lambda_2 \geq 0$ is the parameter controlling the regularization on $v_n$: the larger value of $\lambda_2$, the larger amount of shrinkage on $v_n$.

In this implimentation, a training set is composed of independent and identically distributed (i.i.d.) samples of a distribution p(d). Documents are drawn one document $d_n$ at a time, as in stochastic gradient descent. The process alternates between the document projection step and the term-topic matrix update step. The document projection step computes the topic representation of document $d_n$ as $$v_n = \arg\min_v \|d_n - U_{n-1}v\|_2^2 + \lambda_2 \|v\|_2^2,$$

where $U_{n-1}$ is the term-topic matrix obtained at the previous iteration. The term-topic matrix update step update term-topic matrix:

$$U_n = \arg\min_U \frac{1}{n}\sum_{i=1}^{n} \|d_i - Uv_i\|_2^2 + \lambda_1 \sum_{k=1}^{K} \|u_k\|_1,$$

where the $v_i$'s for i<n have been computed during the previous steps. This procedure is summarized in Algorithm 7 and Algorithm 8.

---
Algorithm 7 Online RLSI
---

Require: p (d)
1: $U_0 \in \mathbb{R}^{M \times K} \leftarrow$ random Matrix
2: $S_0 \subset \mathbb{R}^{K \times K}$, 0, $R_0 \subset \mathbb{R}^{M \times K}$, 0
3: for n = 1, ... , N do
4:     Draw $d_n$ from p(d)
5:     $v_n \leftarrow (U_{n-1}^T U_{n-1} + \lambda_2 I)^{-1} U_{n-1}^T d_n$
6:     $S_n \leftarrow S_{n-1} + v_n v_n^T$
7:     $R_n \leftarrow R_{n-1} + d_n v_n^T$
8:     $U_n \leftarrow \text{UpdateU}(S_n, R_n, n)$
9: end for ---
Algorithm 8 UpdateU
---

Require: $S \in \mathbb{R}^{K \times K}$, $R \in \mathbb{R}^{M \times K}$, $n \in \mathbb{N}_+$
1: for m = 1 : M do
2:     $\bar{u}_m \leftarrow 0$
3:     repeat
4:        for k = 1 : K do
5:           $w_{mk} \leftarrow r_{mk} - \Sigma_{l \neq k} s_{kl} u_{ml}$
6:

$$u_{mk} \leftarrow \frac{\left(|w_{mk}| - \frac{1}{2} n \cdot \lambda_1\right)_+ \text{sign}(w_{mk})}{s_{kk}}$$

7:        end for
8:     until convergence
9: end for
10: return U

In some embodiments, the algorithms 7 and 8 may be implemented for a set number of iterations.

In other embodiments, the algorithms 7 and 8 may be implemented for a variable number of iterations and may be ceased based on convergence. For example, the algorithms may be ceased based at least in part on convergance of term-topic matrix U.

Illustrative Operation

Figure 3:
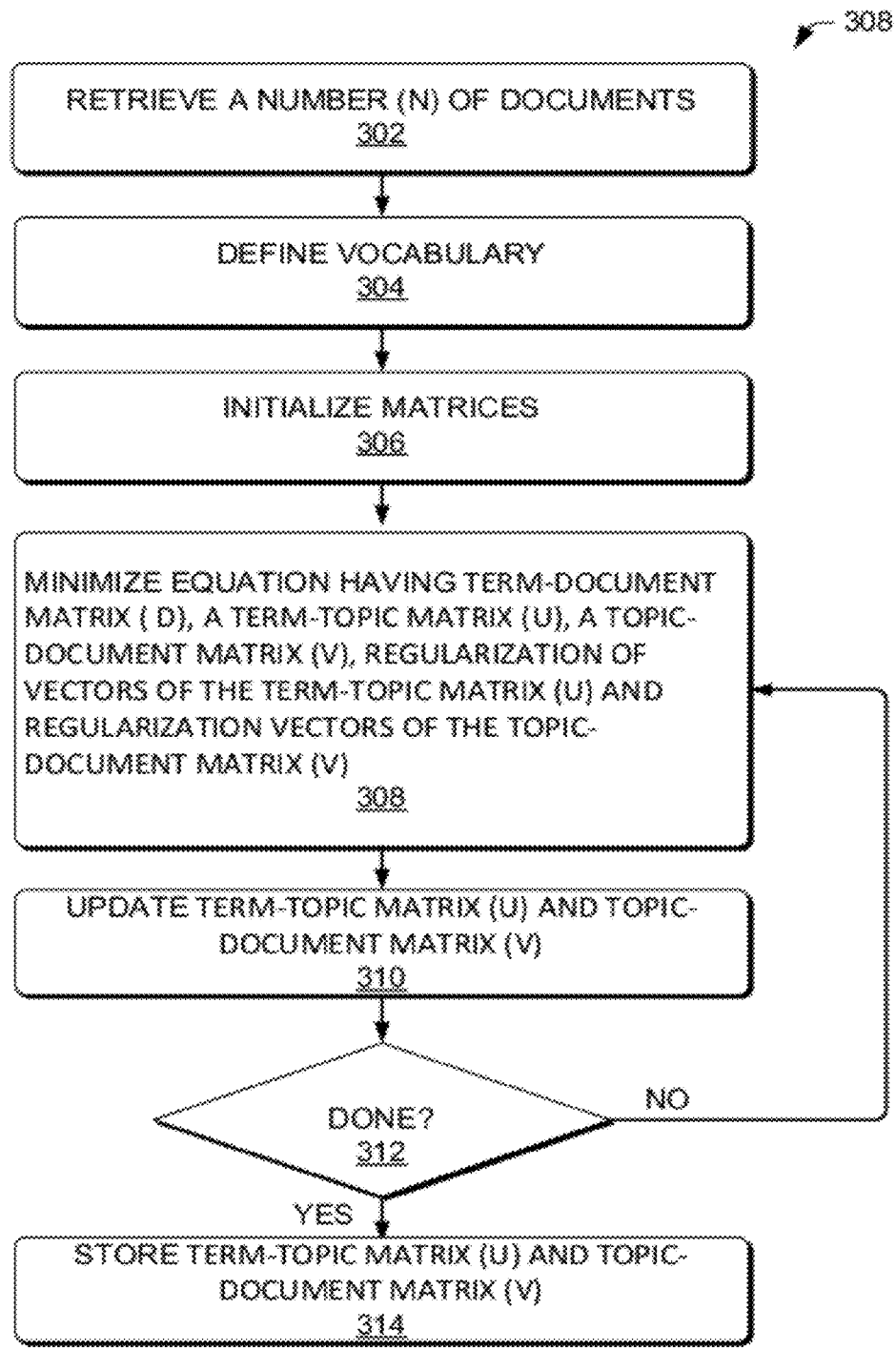
FIG. 3 is a flow diagram of an illustrative process to perform topic modeling.

FIG. 3 is a flow diagram of an illustrative process 300 to perform RLSI. The process 300 is illustrated as a collection of blocks in a logical flow graph, which represent a sequence of operations that can be implemented in hardware, software, or a combination thereof. In the context of software, the blocks represent computer-executable instructions that, when executed by one or more processors, cause the one or more processors to perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes described throughout this disclosure, including the process described with reference to FIG. 2, in addition to process 300 and other processes described hereinafter, shall be interpreted accordingly.

At 302, a number (N) of documents 116, 118, 124 are retrieved from the document source 106 by the RLSI system 102. The number (N) of documents retrieved from the document source 106 may be some or all of the documents currently stored in the static or quasi-static document database 108, and/or the document database 110, and/or the document servers 114.

At 304, RLSI system 102 defines a vocabulary of size M.

At 306, RLSI system 102 initializes matrices. The RLSI system 102 assigns values to a term-document matrix (D) based at least on the retrieved N documents 116, 118, 124 and the vocabulary. The RLSI system 102 may initialize a topic-document matrix (V) to random values.

At 308, the RLSI system 102 minimizes an equation having as terms thereof a term-document matrix (D), a term-topic matrix (U), a topic-document matrix (V), a regularization of vectors of the term-topic matrix (U) and a regularization of vectors of the topic-document matrix (V). The RLSI system 102 may minimize the equation iteratively such as, for example, minimizing the equation while holding the topic-document matrix (V) and then minimizing the equation while hold the term-topic matrix (U).

At 310, the RLSI system 102 updates the term-topic matrix (U) and the topic-document matrix (V).

At 312, the RLSI system 102 determines whether the minimization of the equation is complete. The RLSI system 102 may determine that the minimization of the equation is complete based at least on, for example, a number of iterations (e.g., it is complete after n iterations, where n is greater than zero). Similarly, the RLSI system 102 may determine that the minimization of the equation is complete based at least on convergence of the equation and/or convergence of terms in the equation. For example, the equation may be evaluated after each iteration, and when the equation changes by less than a threshold amount between iterations, then the equation is determined to have converged.

If the determination at 312 is that the minimization is not complete, the process returns to 308 and re-minimizes the equation (i.e., performs another iteration).

On the other hand, if the determination at 312 is that the minimization is complete, the process continues at 314 and stores the term-topic matrix (U) and the topic-document matrix (V).

Figure 4:
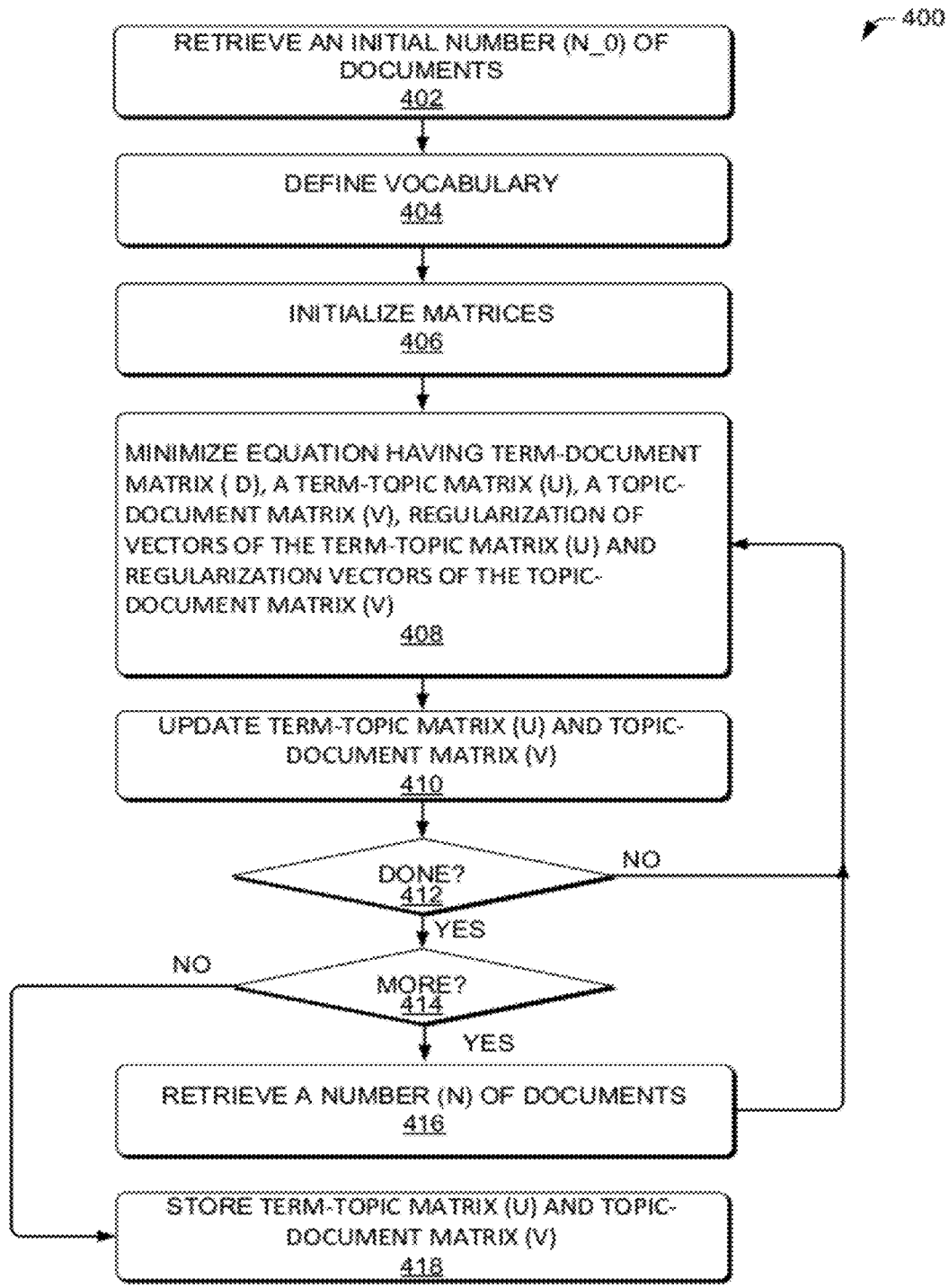
FIG. 4 is a flow diagram of another illustrative process to perform topic modeling.

FIG. 4 is a flow diagram of an illustrative process 400 to perform RLSI in accordance with another embodiment.

At 402, an initial number ($N_0$) of documents 116, 118, 124 are retrieved from the document source 106 by the RLSI system 102. The initial number ($N_0$) of documents retrieved from the document source 106 may be some or all of the documents currently stored in the static or quasi-static document database 108, and/or the document database 110, and/or the document servers 114. In some embodiments, the initial number ($N_O$) of documents retrieved from the document source 106 may be as few as a single document.

At 404, RLSI system 102 defines a vocabulary of size M, which may change over time. In other words, the size of the vocabulary may increase (or decrease) over time as the RLSI system 102 is trained. The size of the of the vocabulary is typically increased as the number of retrieved documents increases.

At 406, RLSI system 102 initializes matrices. The RLSI system 102 assigns values to a term-document matrix (D) based at least on the retrieved initial $N_O$ documents 116, 118, 124 and the vocabulary. The RLSI system 102 may initialize a topic-document matrix (V) to random values.

At 408, the RLSI system 102 minimizes an equation having as terms thereof a term-document matrix (D), a term-topic matrix (U), a topic-document matrix (V), a regularization of vectors of the term-topic matrix (U) and a regularization vectors of the topic-document matrix (V). The RLSI system 102 may minimize the equation iteratively such as, for example, minimizing the equation while holding the topic-document matrix (V) and then minimizing the equation while holding the term-topic matrix (U).

At 410, the RLSI system 102 updates the term-topic matrix (U) and the topic-document matrix (V).

At 412, the RLSI system 102 determines whether the minimization of the equation is complete. The RLSI system 102 may determine that the minimization of the equation is complete based at least on, for example, a number of iterations (e.g., it is complete after n iterations, where n is greater than zero). Similarly, the RLSI system 102 may determine that the minimization of the equation is complete based at least on convergence of the equation and/or convergence of terms in the equation. For example, the equation may be evaluated after each iteration, and when the equation changes by less than a threshold amount between iterations, then the equation is determined to have converged.

If the determination at 412 is that the minimization is not complete, the process returns to 408 and re-minimizes the equation (i.e., performs another iteration).

On the other hand, if the determination at 412 is that the minimization is complete, the process continues at 414, where the RLSI system 102 determines whether there are more documents.

If there are more documents, then at 416, the RLSI system 102 retrieves a number (N) of documents 116, 118, 124 from the document source 106, where N is greater than or equal to one. The RLSI system 102 may also resize, if necessary, matrices based at least in part on the number (N) of documents retrieved. The process then returns to 408.

If the determination at 414 is that there are no more documents, the process continues at 418 and the RLSI system 102 stores the term-topic matrix (U) and the topic-document matrix (V).

Figure 5:
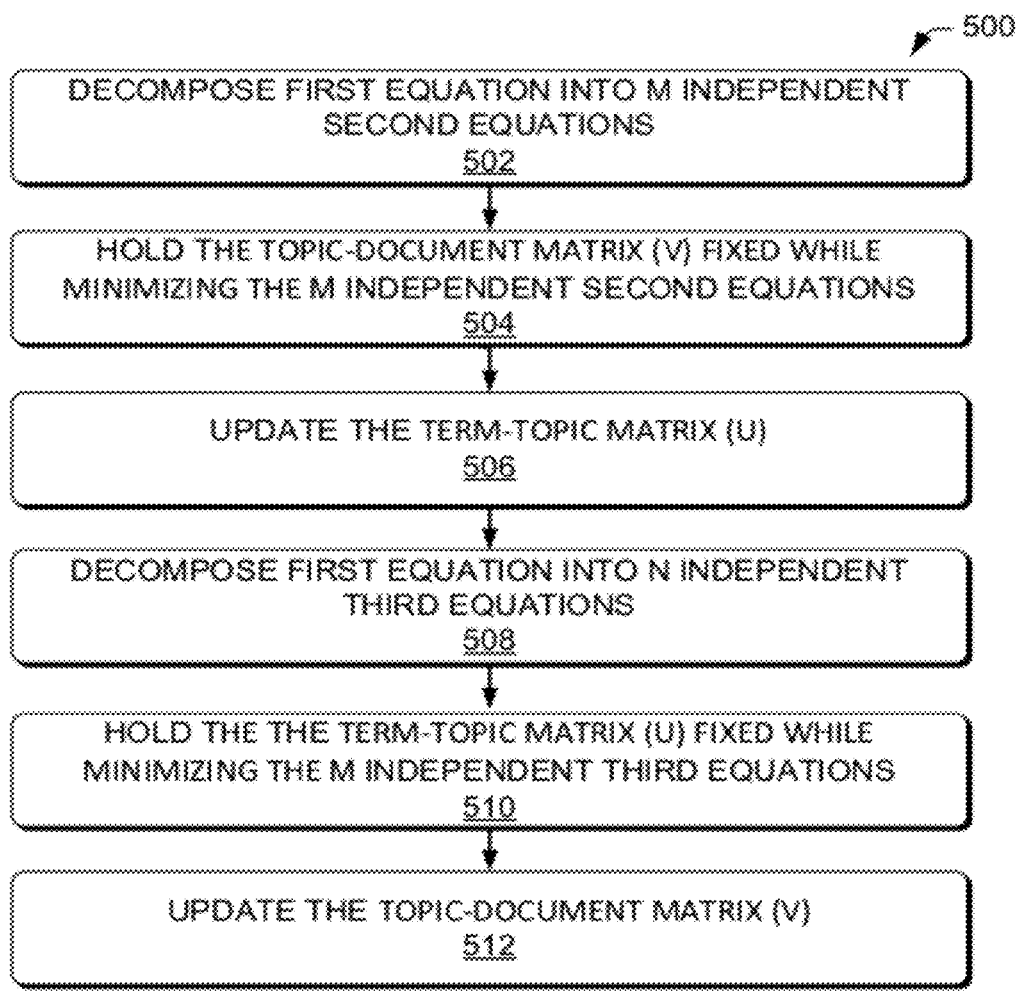
FIG. 5 is a flow diagram of yet another illustrative process to perform topic modeling.

FIG. 5 is a flow diagram of an illustrative process 500 to minimize a first equation having as terms thereof a term-document matrix (D), a term-topic matrix (U), a topic-document matrix (V), a regularization of vectors of the term-topic matrix (U) and a regularization vectors of the topic-document matrix (V).

At 502, the RLSI system 102 decomposes the first equation into M independent second equations.

At 504, the RLSI system 102 holds the topic-document matrix (V) fixed while minimizing the M independent second equations. Typically, the M independent second equations are minimized in parallel on separate calculating units.

At 506, the RLSI system 102 updates the term-topic matrix (U).

At 508, the RLSI system 102 decomposes the first equation into N independent third equations.

At 510, the RLSI system 102 holds the term-topic matrix (U) fixed while minimizing the N independent third equations. Typically, the N independent third equations are minimized in parallel on separate calculating units.

At 512, the RLSI system 102 updates the topic-document matrix (V).

Illustrative Computing Device

Figure 6:
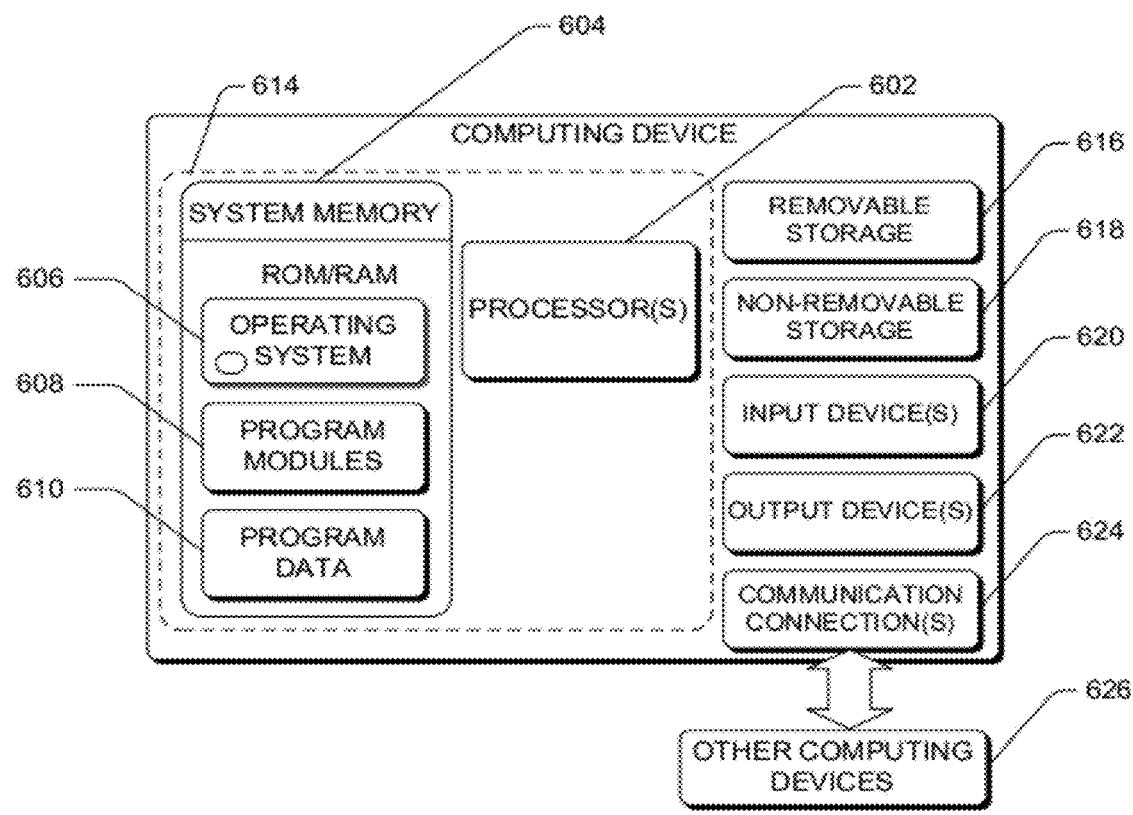
FIG. 6 is a block diagram of an illustrative computing device that may be deployed in the environment shown in FIG. 1.

FIG. 6 shows an illustrative computing device 600 that may be used to implement the RLSI. It will readily be appreciated that the various embodiments described above may be implemented in other computing devices, systems, and environments. The computing device 600 shown in FIG. 8 is only one example of a computing device and is not intended to suggest any limitation as to the scope of use or functionality of the computer and network architectures. The computing device 600 is not intended to be interpreted as having any dependency or requirement relating to any one or combination of components illustrated in the example computing device.

In a very basic configuration, the computing device 600 typically includes at least one processing unit 602 and system memory 604. Depending on the exact configuration and type of computing device, the system memory 604 may be volatile (such as RAM), non-volatile (such as ROM, flash memory, etc.) or some combination of the two. The system memory 604 typically includes an operating system 606, one or more program modules 608, and may include program data 610. The computing device 600 is of a very basic configuration demarcated by a dashed line 614.

The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 616 and non-removable storage 618. Computer-readable media may include, at least, two types of computer-readable media, namely computer storage media and communication media. Computer storage media may include volatile and non-volatile, removable, and non-removable media implemented in any method or technology for storage of information, such as computer readable instructions, data structures, program modules, or other data. The system memory 604, the removable storage 616 and the non-removable storage 618 are all examples of computer storage media. Computer storage media includes, but is not limited to, RAM, ROM, EEPROM, flash memory or other memory technology, CD-ROM, digital versatile disks (DVD), or other optical storage, magnetic cassettes, magnetic tape, magnetic disk storage or other magnetic storage devices, or any other non-transmission medium that can be used to store the desired information and which can be accessed by the computing device 600. Any such computer storage media may be part of the computing device 600. Moreover, the computer-readable media may include computer-executable instructions that, when executed by the processor(s) 602, perform various functions and/or operations described herein.

In contrast, communication media may embody computer-readable instructions, data structures, program modules, or other data in a modulated data signal, such as a carrier wave, or other transmission mechanism. As defined herein, computer storage media does not include communication media.

The computing device 600 may also have input device(s) 620 such as keyboard, mouse, pen, voice input device, touch input device, etc. Output device(s) 622 such as a display, speakers, printer, etc. may also be included. These devices are well known in the art and are not discussed at length here.

The computing device 600 may also contain communication connections 624 that allow the device to communicate with other computing devices 626, such as over a network. These networks may include wired networks as well as wireless networks. The communication connections 624 are one example of communication media.

It is appreciated that the illustrated computing device 600 is only one example of a suitable device and is not intended to suggest any limitation as to the scope of use or functionality of the various embodiments described. Other well-known computing devices, systems, environments and/or configurations that may be suitable for use with the embodiments include, but are not limited to personal computers, server computers, hand-held or laptop devices, multiprocessor systems, microprocessor-base systems, set top boxes, game consoles, programmable consumer electronics, network PCs, minicomputers, mainframe computers, distributed computing environments that include any of the above systems or devices, and/or the like. For example, some or all of the components of the computing device 600 may be implemented the RLSI system 102.

CONCLUSION

Although the techniques have been described in language specific to structural features and/or methodological acts, it is to be understood that the appended claims are not necessarily limited to the specific features or acts described. Rather, the specific features and acts are disclosed as exemplary forms of implementing such techniques.

What is claimed is:

1. A topic modeling system, comprising:
   at least one calculating unit; and
   at least one computer readable medium in communication with the at least one calculating unit and having instructions and a first equation stored therein, the first equation having terms including a term-document matrix D, a term-topic matrix U, a topic-document matrix V, a regularization of vectors of the term-topic matrix U and a regularization of vectors of the topic-document matrix V, the term-document matrix D having N columns, N>1, each column of the term-document matrix D representing a respective document and having M (M>1) members in which each member represents a respective term of the respective document, the term-topic matrix U and the topic-document matrix V are related such that the term-document matrix D is approximated by a matrix multiplication of the term-topic matrix U and the topic-document matrix V, when executed by the at least one calculating unit, cause the at least one calculating unit to perform acts comprising:
   for a number of iterations,
      minimizing the first equation while holding the topic-document matrix V fixed;
      updating the term-topic matrix U based at least on values of the topic-document matrix V calculated in a most recent minimization of the first equation;
      minimizing the first equation while holding the term-topic matrix U fixed; and
      updating the topic-document matrix V based at least on values of the term-topic matrix U calculated in a most recent minimization of the first equation.

2. The topic modeling system as recited in claim 1, wherein the at least one calculating unit comprises multiple calculating units, and the acts further comprise:
   providing each calculating unit of a first plurality of calculating units with at least a respective vector of the term-document matrix D and at least a respective vector of the term-topic matrix U, most recently updated, the multiple calculating units including the first plurality of calculating units; and
   wherein the minimizing the first equation while holding the topic-document matrix V fixed includes:
   independently solving a respective vector of the term-topic matrix U at a respective calculating unit of the first plurality of calculating units based at least in part on the respective calculating unit minimizing a respective second equation that is a decomposition of the first equation.

3. The topic modeling system as recited in claim 2, the acts further comprising:
   providing each calculating unit of a second plurality of calculating units with at least a respective vector of the term-document matrix D and at least a respective vector of the topic-document matrix V, most recently updated, the multiple calculating units including the second plurality of calculating units; and
   wherein the minimizing the first equation while holding term-topic matrix U fixed includes:
   independently solving a respective vector of the topic-document matrix V at a respective calculating unit of the second plurality of calculating units based at least in part on the respective calculating unit minimizing a respective third equation that is a decomposition of the first equation.

4. The topic modeling system as recited in claim 3, wherein the multiple calculating units include multiple processors of a single computer.

5. The topic modeling system as recited in claim 3, wherein the multiple calculating units include computing systems coupled together over a communication network.

6. The topic modeling system as recited in claim 1, wherein the minimizing the first equation while holding the topic-document matrix V fixed includes the regularization of vectors of the term-topic matrix U, and the minimizing the first equation while holding the term-topic matrix U fixed includes the regularization of vectors of the topic-document matrix V.

7. The topic modeling system as recited in claim 6, wherein the regularization of vectors of the term-topic matrix U is based on either an l1 norm or an l2 norm and the regularization of vectors of the topic-document matrix V is based on either an l1 norm or an l2 norm.

8. The topic modeling system as recited in claim 7, wherein the regularization of vectors of the term-topic matrix U is based on the l1 norm and the regularization of vectors of the topic-document matrix V is based on the l2 norm.

9. The topic modeling system as recited in claim 1, the acts further comprising:
   retrieving a number (N) of electronic documents;
   generating the term-document matrix D based at least on the retrieved documents; and
   initializing the topic-document matrix V based at least on random values assigned to members of the topic-document matrix V.

10. The topic modeling system as recited in claim 1, wherein the minimizing the first equation while holding the topic-document matrix V fixed includes the regularization of column vectors of the term-topic matrix U, and the minimizing the first equation while holding the term-topic matrix U fixed includes the regularization of column vectors of the topic-document matrix V.

11. The topic modeling system as recited in claim 10, wherein the regularization of column vectors of the term-topic matrix U is based on an $l_1$ norm and the regularization column vectors of the topic-document matrix V is based on an $l_2$ norm.

12. A computer-implemented method for topic modeling, comprising:
defining a first equation having terms including a term-document matrix D, a term-topic matrix U, a topic-document matrix V, a regularization of vectors of the term-topic matrix U and a regularization of vectors of the topic-document matrix V, the term-document matrix D having N columns, N>1, each column of the term-document matrix D representing a respective document and having M (M>1) members in which each member represents a respective term of the respective document, the term-topic matrix U and the topic-document matrix V are related such that a matrix multiplication of the term-topic matrix U and the topic-document matrix V is approximated as the term-document matrix D;
retrieving a number (N) of electronic documents;
representing each retrieved document as a respective vector of the term-document matrix D; and
for a number of iterations,
minimizing the first equation while holding the topic-document matrix V fixed,
updating the term-topic matrix U based at least on values of the topic-document matrix V calculated in a most recent minimization of the first equation,
minimizing the first equation while holding the term-topic matrix U fixed, and
updating the topic-document matrix V based at least on values of the term-topic matrix U calculated in a most recent minimization of the first equation; and
storing, at a computer readable storage medium, at least one of the most recently updated term-topic matrix U and the topic-document matrix V.

13. The method as recited in claim 12, further comprising:
providing each calculating unit of a first plurality of calculating units with at least a respective vector of the term-document matrix D and at least a respective vector of the term-topic matrix U, most recently updated, the multiple calculating units including the first plurality of calculating units; and
wherein the minimizing the first equation while holding the topic-document matrix V fixed includes:
independently solving a respective vector of the term-topic matrix U at a respective calculating unit of the first plurality of calculating units based at least in part on the respective calculating unit minimizing a respective second equation that is a decomposition of the first equation.

14. The method as recited in claim 13, further comprising:
providing each calculating unit of a second plurality of calculating units with at least a respective vector of the term-document matrix D and at least a respective vector of the topic-document matrix V, most recently updated, the multiple calculating units including the second plurality of calculating units; and
wherein the minimizing the first equation while holding term-topic matrix U fixed includes:
independently solving a respective vector of the topic-document matrix V at a respective calculating unit of the second plurality of calculating units based at least in part on the respective calculating unit minimizing a respective third equation that is a decomposition of the first equation.

15. The method as recited in claim 12, wherein the minimizing the first equation while holding the topic-document matrix V fixed includes regularizing vectors of the term-topic matrix U, and the minimizing the first equation while holding the term-topic matrix U fixed includes regularizing vectors of the topic-document matrix V.

16. The method as recited in claim 15, wherein the regularizing vectors of the term-topic matrix U is based on either an $l_1$ norm or an $l_2$ norm and the regularizing vectors of the topic-document matrix V is based on either an $l_1$ norm or an $l_2$ norm.

17. The topic modeling system as recited in claim 16, wherein the regularizing vectors of the term-topic matrix U is based on an $l_1$ norm and the regularizing vectors of the topic-document matrix V is based on an $l_2$ norm.

18. One or more computer-readable storage media storing computer-executable instructions that, when executed on one or more processors, causes the one or more processors to perform acts comprising:
retrieving a number (N) of electronic documents;
representing each retrieved document as a respective vector of a term-document matrix D;
defining a first equation having terms including the term-document matrix D, a term-topic matrix U, a topic-document matrix V, the term-topic matrix U and the topic-document matrix V are related such that a matrix multiplication of the term-topic matrix U and the topic-document matrix V is approximated as the term-document matrix D;
independently solving in parallel for vectors of the topic-document matrix V and the term-topic matrix U; and
updating the topic-document matrix V and the term-topic matrix U based at least in part of the solved vectors of the document matrix V and the term-topic matrix U; and
storing at least one of the document matrix V and the term-topic matrix U.

19. The one or more computer-readable storage media as recited in claim 18, wherein the independently solving in parallel for vectors of the topic-document matrix V and the term-topic matrix U includes regularizing vectors of the term-topic matrix U based on either an $l_1$ norm or an $l_2$ norm and regularizing vectors of the topic-document matrix V based on either an $l_1$ norm or an $l_2$ norm.

20. The one or more computer-readable storage media as recited in claim 18, wherein the independently solving in parallel for vectors of the topic-document matrix V and the term-topic matrix U comprises:
holding the topic-document matrix V fixed while solving in parallel for the vectors of the term-topic matrix U; and
holding the term-topic matrix U fixed while solving in parallel for the vectors of the topic-document matrix V.

* * * * *